United States Patent
Nakayama et al.

(10) Patent No.: US 6,896,345 B2
(45) Date of Patent: May 24, 2005

(54) RECORDING APPARATUS AND METHOD FOR CONTROLLING RECORDING APPARATUS

(75) Inventors: Toru Nakayama, Kanagawa (JP); Souhei Tanaka, Kanagawa (JP); Tetsushi Kono, Tokyo (JP); Takeaki Nakano, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/413,144

(22) Filed: Apr. 15, 2003

(65) Prior Publication Data

US 2003/0193535 A1 Oct. 16, 2003

(30) Foreign Application Priority Data

Apr. 15, 2002 (JP) ........................................ 2002-112658

(51) Int. Cl.[7] .......................... B41J 29/38; B41J 29/393
(52) U.S. Cl. ............................................. 347/5; 347/19
(58) Field of Search ................................ 347/5, 19, 12, 347/10, 8, 9, 41, 11, 37, 14, 23; 382/57; 358/1.116

(56) References Cited

U.S. PATENT DOCUMENTS

| 4,313,124 A | 1/1982 | Hara |
| 4,345,262 A | 8/1982 | Shirato et al. |
| 4,459,600 A | 7/1984 | Sato et al. |
| 4,463,359 A | 7/1984 | Ayata et al. |
| 4,558,333 A | 12/1985 | Sugitani et al. |
| 4,608,577 A | 8/1986 | Hori |
| 4,723,129 A | 2/1988 | Endo et al. |
| 4,740,796 A | 4/1988 | Endo et al. |
| 5,412,483 A | 5/1995 | Ludlow et al. ............. 358/401 |
| 5,436,863 A | 7/1995 | Kogure ................... 365/189.04 |
| 5,751,327 A | 5/1998 | De Cock et al. ............ 347/130 |
| 5,838,888 A | * 11/1998 | Oda .......................... 358/1.16 |
| 5,914,731 A | * 6/1999 | Yano et al. ................... 347/9 |
| 5,923,344 A | 7/1999 | Norum et al. ................. 347/9 |
| 6,036,297 A | 3/2000 | Hayasaki ..................... 347/13 |
| 6,097,499 A | 8/2000 | Casey et al. |
| 6,120,129 A | 9/2000 | Iwasaki et al. |
| 2002/0191068 A1 | 12/2002 | O'Hara et al. .............. 347/237 |

FOREIGN PATENT DOCUMENTS

| EP | 1 120 253 | 8/2001 |
| JP | 54-56847 | 5/1979 |
| JP | 58-146929 | 9/1983 |
| JP | 59-121432 | 7/1984 |
| JP | 59-123670 | 7/1984 |
| JP | 59-138461 | 8/1984 |
| JP | 60-71260 | 4/1985 |
| JP | 11-192746 | 7/1999 |
| JP | 11-259248 | 9/1999 |

* cited by examiner

Primary Examiner—Stephen D. Meier
Assistant Examiner—Charles Stewart
(74) Attorney, Agent, or Firm—Fitzpatrick, Cella, Harper & Scinto

(57) ABSTRACT

A recording apparatus capable of efficiently using a buffer area includes a write control unit for controlling write address information about image data in the area unit for each piece of color data for storage of the image data divided in an area unit in the buffer; a read-out control unit for generating address information for reading of the stored image data; a storage management unit for storing in a first register group and managing first setting information for control of reading of image data according to the address information corresponding to the generated address information; a record data generation unit for reading data from the buffer according to the first setting information and the address information, and generating record data; and a recording head position control unit for detecting a scanning position of the recording head for recording the generated data using an encoder, and controlling a recording position according to the detected scanning position information.

22 Claims, 14 Drawing Sheets

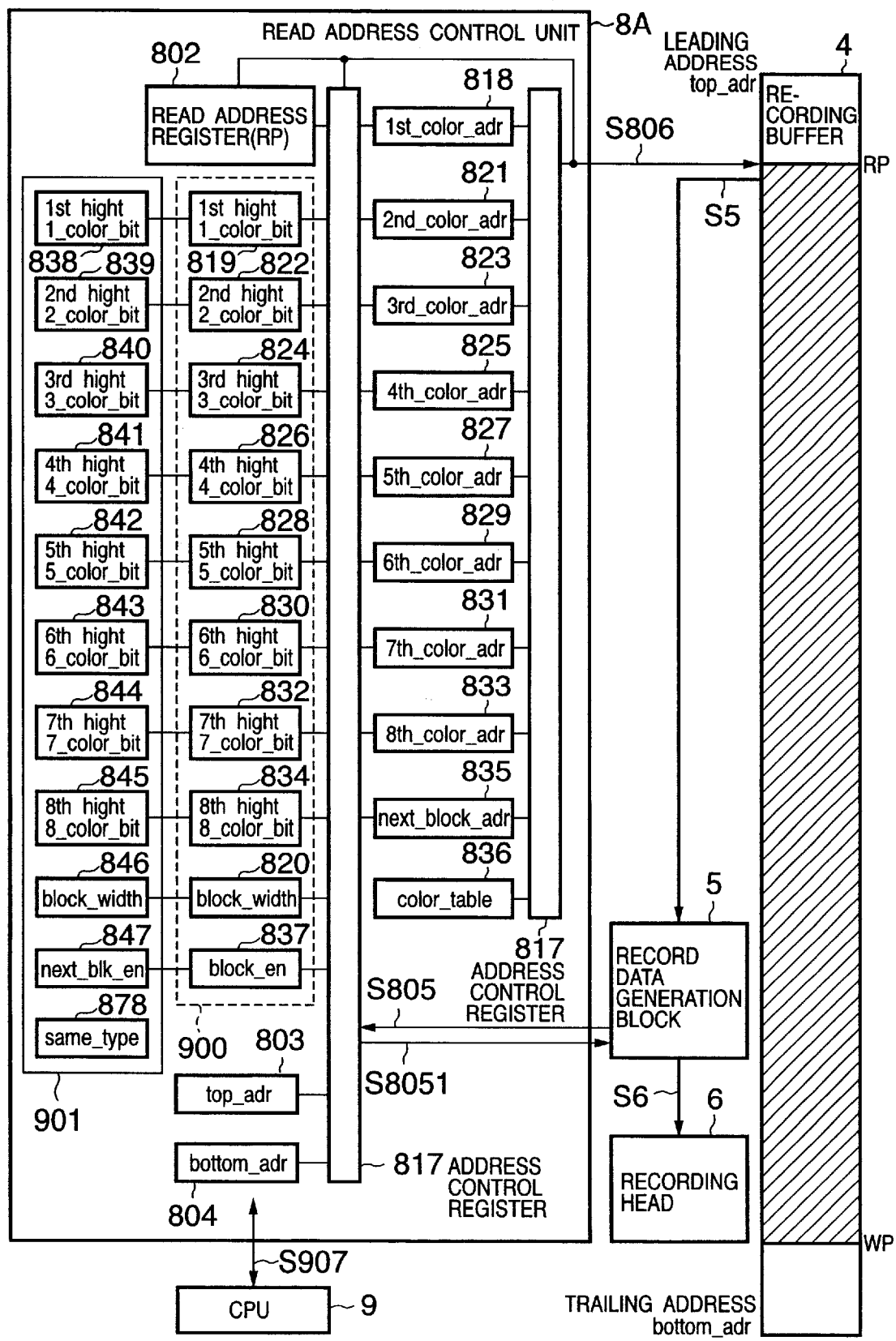

FIG. 11

| FIRST BLOCK | SECOND BLOCK | THIRD BLOCK | FOURTH BLOCK | FIFTH BLOCK | SIXTH BLOCK | SEVENTH BLOCK | EIGHTH BLOCK |
|---|---|---|---|---|---|---|---|
| FIRST COLOR DATA | FIRST COLOR DATA | FIRST COLOR DATA | FIRST COLOR DATA | FIRST COLOR DATA | FIRST COLOR DATA | FIRST COLOR DATA | FIRST COLOR DATA |
| SECOND COLOR DATA | SECOND COLOR DATA | SECOND COLOR DATA | SECOND COLOR DATA | SECOND COLOR DATA | SECOND COLOR DATA | SECOND COLOR DATA | SECOND COLOR DATA |
| THIRD COLOR DATA | THIRD COLOR DATA | THIRD COLOR DATA | THIRD COLOR DATA | THIRD COLOR DATA | THIRD COLOR DATA | THIRD COLOR DATA | THIRD COLOR DATA |
| FOURTH COLOR DATA | FOURTH COLOR DATA | FOURTH COLOR DATA | FOURTH COLOR DATA | FOURTH COLOR DATA | FOURTH COLOR DATA | FOURTH COLOR DATA | FOURTH COLOR DATA |
| FIFTH COLOR DATA | FIFTH COLOR DATA | FIFTH COLOR DATA | FIFTH COLOR DATA | FIFTH COLOR DATA | FIFTH COLOR DATA | FIFTH COLOR DATA | FIFTH COLOR DATA |
| SIXTH COLOR DATA | SIXTH COLOR DATA | SIXTH COLOR DATA | SIXTH COLOR DATA | SIXTH COLOR DATA | SIXTH COLOR DATA | SIXTH COLOR DATA | SIXTH COLOR DATA |
| SEVENTH COLOR DATA | SEVENTH COLOR DATA | SEVENTH COLOR DATA | SEVENTH COLOR DATA | SEVENTH COLOR DATA | SEVENTH COLOR DATA | SEVENTH COLOR DATA | SEVENTH COLOR DATA |
| EIGHTH COLOR DATA | EIGHTH COLOR DATA | EIGHTH COLOR DATA | EIGHTH COLOR DATA | EIGHTH COLOR DATA | EIGHTH COLOR DATA | EIGHTH COLOR DATA | EIGHTH COLOR DATA |

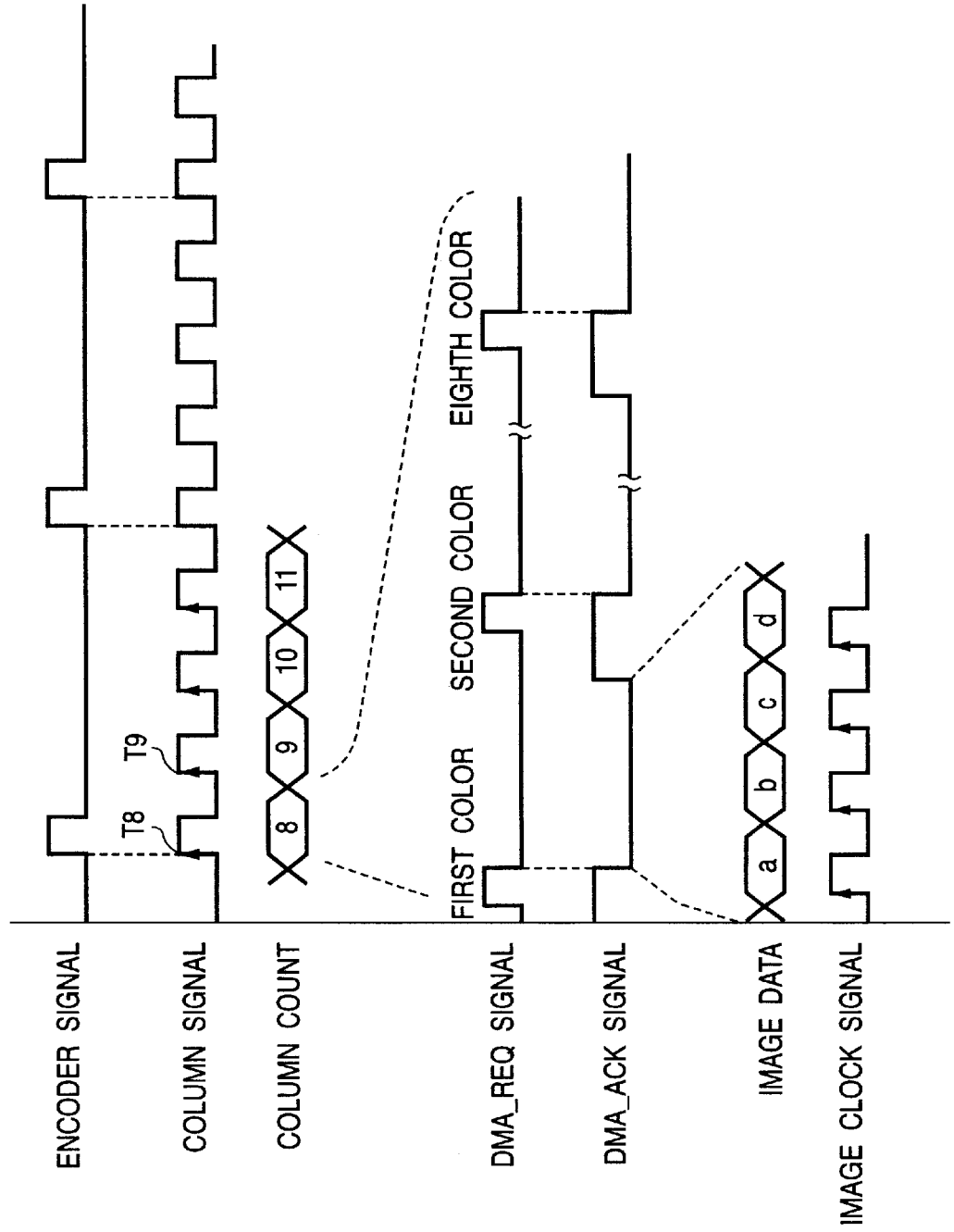

RECORDING APPARATUS AND METHOD FOR CONTROLLING RECORDING APPARATUS

FIELD OF THE INVENTION

The present invention relates to a recording apparatus and a method for controlling a recording apparatus, and more specifically to the technology of realizing a less expensive, high-speed, and high image quality recording apparatus. In detail, it relates to an inkjet recording apparatus and a method for controlling the recording apparatus for reducing the RAM requirement or the ROM requirement in the recording apparatus, or the number of ASIC gates, reducing the ASIC cost, realizing a less expensive recording apparatus, and maintaining a high-speed process with high image quality.

BACKGROUND OF THE INVENTION

Conventionally, an inkjet recording apparatus has been easily realized as a low noise, low apparatus cost, low running cost, and downsized apparatus. Therefore, it has been widely used as a recording apparatus, a copier, etc. A serial inkjet recording apparatus is one of the embodiments, and records data of one path by repeating the operation of a recording head in the main scanning direction and the transfer of a recording medium in the sub scanning direction. Control is performed by reserving a sufficient memory capacity for storing all data to be recorded in at least one main scanning direction, and starting the main scanning drive of the recording head after storing all data to be recorded in one main scanning direction.

However, there has been the problem that the above-mentioned conventional configuration requires a large amount of expensive memory against the recent request for a lower cost, and results in a costly apparatus. In this situation, Japanese Patent Laid-Open No. 58-146929 has suggested an apparatus having memory smaller than the memory for one main scanning direction in managing the addresses for storage of record data.

However, the suggestion does not disclose the processing of null data ("0" data) which is not recorded. Accordingly, although there is no data to be stored in the memory, a predetermined area is reserved in the memory, thereby failing in successfully disclosing an apparatus for efficiently utilizing the memory.

Furthermore, it does not disclose any data processing to be performed when additional data to the recording operation during the recording process cannot be provided in time.

Additionally, in Japanese Patent Laid-Open No. 11-259248, it is suggested that the main scanning is to be started before the data for one main scanning direction is completely input into the buffer. However, this suggestion is based on the reception of data sufficient to complete the scanning during printing of the scanning while performing the main scanning along the printing path.

As a result, for example, it is necessary for a host computer which is an upper apparatus to continuously transfer data without interruption to the recording apparatus during printing (580). The currently predominant Windows System is a general-purpose multitask system, and the exclusive data transfer by the host computer is not guaranteed, but it is rather difficult to realize the desired host processing.

Otherwise, to allow the host computer to exclusively perform data transfer, it is necessary to prepare the program of the printer driver unit such that the data transfer can be performed without interruption. However, in this case, there occurs a disadvantage of interfering with the general-purpose multitask system.

Furthermore, Japanese Patent Laid-Open No. 11-259248, as in the above-mentioned Japanese Patent Laid-Open No. 58-146929, does not disclose the processing of null data which is not to be recorded, thereby failing in suggesting a method of efficiently using memory.

The present invention aims at providing a recording apparatus and a method for controlling the recording apparatus by dividing the contents of the color record data recorded on a record medium using a recording head into a plurality of recording blocks in the scanning direction, storing the image data from the host computer in a recording block unit, and recording the data. Although the image data cannot be stored in time for a recording operation, the stored image data is recorded, the remaining image data is stored, and then scanning is executed again to record the remaining image data, thereby completing the recording and realizing the recording control.

SUMMARY OF THE INVENTION

To solve the above-mentioned problem, the recording apparatus and the method for controlling the recording apparatus include the following configuration.

That is, a recording apparatus has a buffer for dividing a storage area into a plurality of areas in a scanning direction of a recording head to record data by allowing a carriage loaded with the recording head to scan data on a record medium, and storing the divided image data in a divided area unit, and recording head position detection means for detecting a position of the recording head, and includes: a write control unit for controlling write address information about image data in the area unit for each piece of color data for storage of the image data divided in an area unit in the buffer; a read-out control unit for generating address information for reading of the stored image data; storage management means for storing in first storage means and managing first setting information for control of a reading of image data according the address information corresponding to the generated address information; record data generation means for reading the stored data from the buffer according to the first setting information stored in the storage management means and the address information, and generating record data; and recording head position control means for detecting a scanning position of the recording head for recording the generated data using the recording head position detection means, and controlling a recording position according to the detected scanning position information.

According to another aspect of the invention, a method for controlling a recording apparatus has a buffer for dividing a storage area into a plurality of areas in a scanning direction of a recording head to record data by allowing a carriage loaded with the recording head to scan data on a record medium, storing the divided image data in a divided area unit, and recording head position detection means for detecting a position of the recording head, and includes: a write controlling step of controlling write address information about image data in the area unit for each piece of color data for storage of the image data divided in an area unit in the buffer; a read-out controlling step of generating address information for read of the stored image data; a storage managing step of storing in a first register and managing first setting information for control of a read of image data according the address information corresponding to the generated address information; a record data generating step of reading the stored data from the buffer according to the first setting information and the address information, and generating record data; and a recording head position controlling step of detecting a scanning position of the recording head for recording the generated data using the recording head position detection means, and controlling a recording position according to the detected scanning position information.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 9 shows the details of a read address control unit of a record buffering structure control circuit in the recording apparatus according to an embodiment of the present invention;

FIG. 11 shows the data structure of a recording buffer holding image data;

FIG. 13 shows a signal relating to an encoder signal processing block in a record data generation block 5.

DETAILED DESCRIPTION OF THE PREFERRED EMBODIMENTS

Preferred embodiments of the present invention will be described in detail in accordance with the accompanying drawings.

The embodiments of the present invention are described below in detail by referring to the attached drawings.

Figure 1:
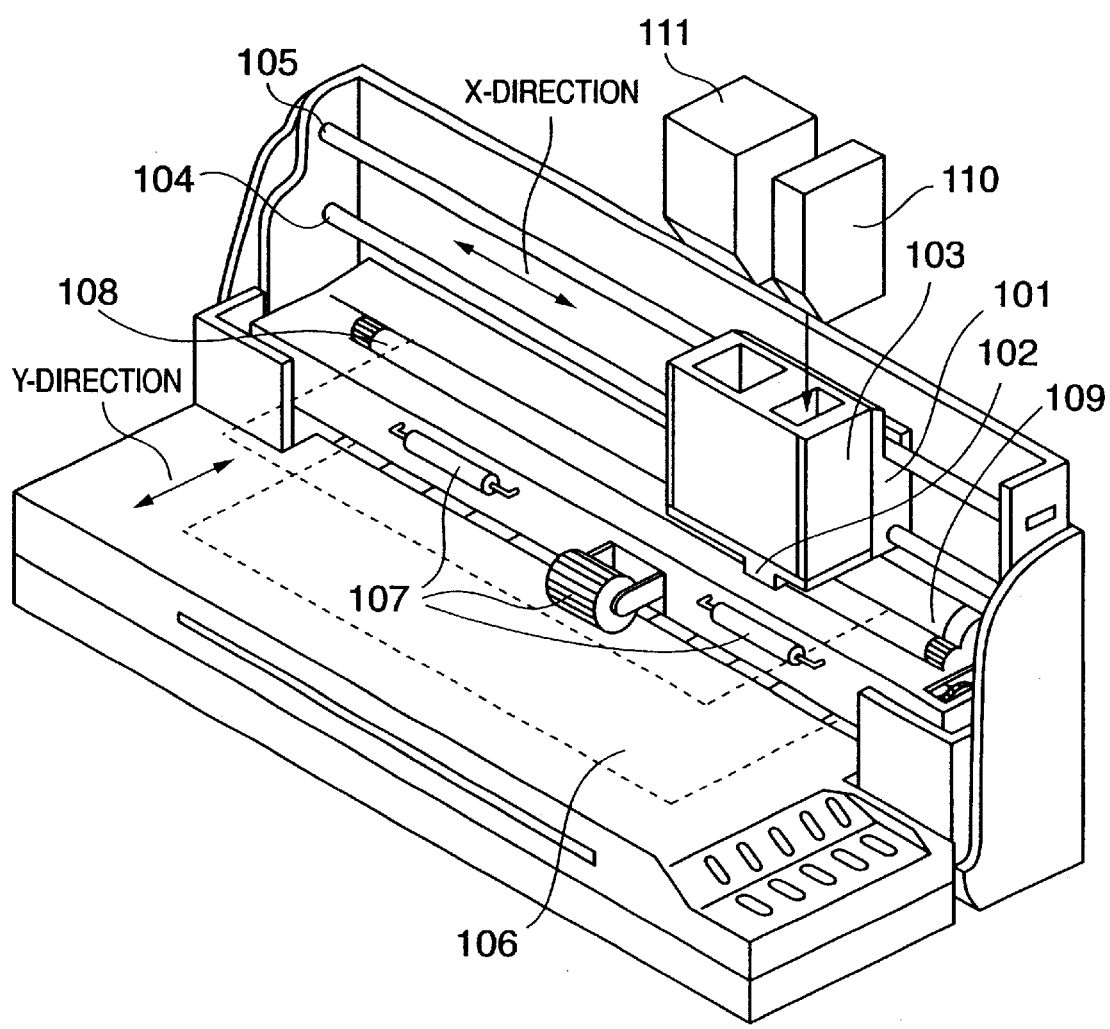
FIG. 1 is an oblique view of an inkjet printer commonly used by the embodiments of the present invention.

FIG. 1 is an oblique view of an inkjet printer commonly used by the embodiments of the present invention. The inkjet printer has the configuration applicable for both color printing and monochrome printing. As shown in FIG. 1, a carriage 101 is loaded with a multinozzle recording head 102 having 320 nozzles for black and 128 nozzles for each color, and a cartridge guide 103. The recording head 102 jets black (K) ink or cyan (C), magenta (M), yellow (Y), and black (K) ink. During the operation of a printer, an ink cartridge 110 containing black ink and an ink cartridge 111 containing ink in the other three colors are attached to the recording head 102.

From each ink cartridge, the ink of cyan (C), magenta (M), yellow (Y), and black (K) is provided. Additionally, a drive signal of each nozzle at the recording head is provided through a flexible cable (not shown in the attached drawings) having an array of a number of leads.

Figure 7:
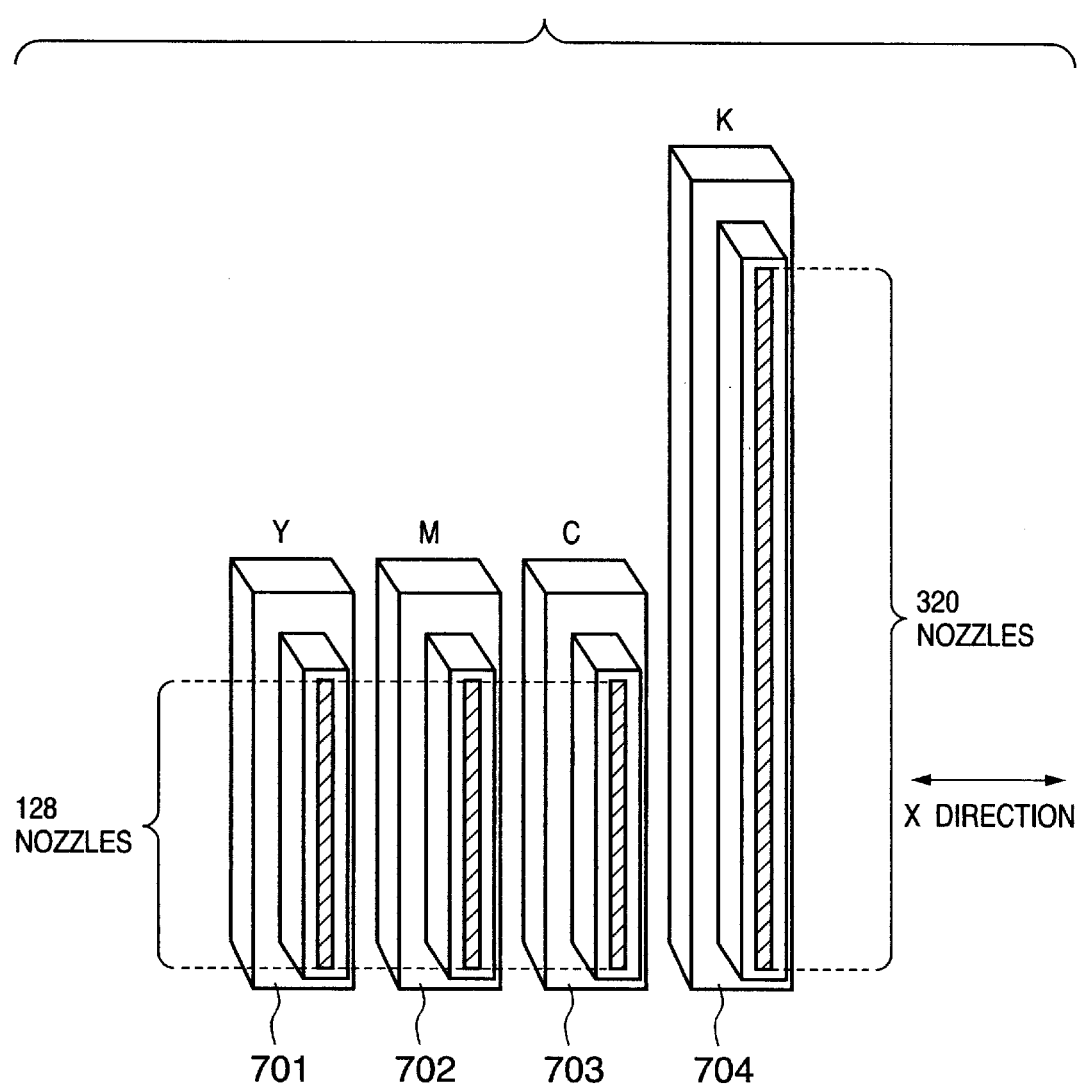
FIG. 7 is an oblique view of a recording head 102 for color printing which can be applied to an inkjet printer from the record medium 106 according to an embodiment of the present invention.

FIG. 7 is an oblique view of a recording head 102 for color printing which can be applied to an inkjet printer from the record medium 106 according to an embodiment of the present invention. The nozzle array of each color (yellow (Y) 701, magenta (M) 702, cyan (C) 703, and black (K) 704) is arranged in the direction orthogonal to the scanning direction (X direction).

On the other hand, the carriage 101 is mounted in two guide rails 104 and 105, and the carriage 101 is driven for two-way scanning in the X direction (hereinafter, the X direction is referred to as a "main scanning direction") by driving an endless belt 109 connected to the carriage 101 by a carrier motor (described later). Furthermore, a carrier roller 108 is driven by a transfer motor (described later) for transferring the record medium 106 in the Y direction (hereinafter, the Y direction is referred to as a "sub scanning direction").

In parallel with the guide rails, an encoder slit (not shown in the attached drawings) is arranged. By the sensor (not shown in the attached drawings) mounted in the carriage 101 reading the number of encoder slits, the position of the scanning direction is captured, and the position of the carriage is controlled in a pixel unit according to the position information.

Figure 2:
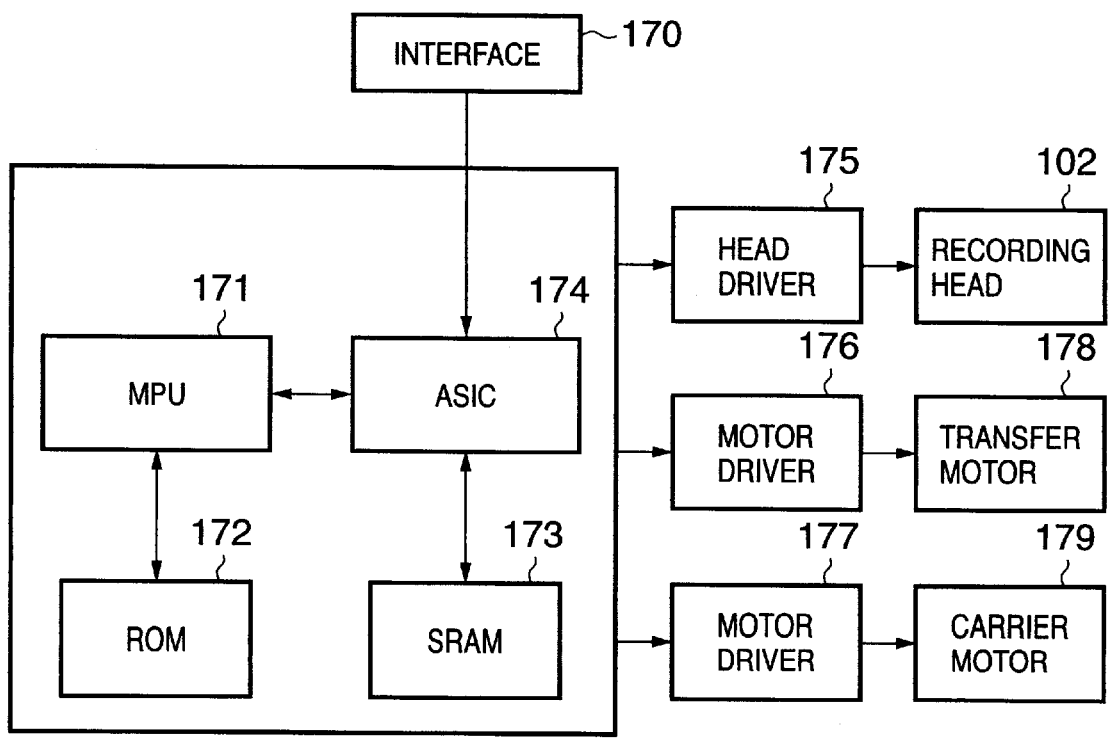
FIG. 2 is a block diagram of the configuration of the control circuit of an inkjet printer.

FIG. 2 is a block diagram of the configuration of the control circuit of an inkjet printer. In FIG. 2, an interface 170 inputs a record signal, and inputs, for example, data from an external device such as a host computer, etc. Reference numeral 171 denotes an MPU. ROM 172 stores a control program (containing a character font as necessary) executed by the MPU 171, and SRAM 173 temporarily stores various data (the above-mentioned record signal, record data provided for a head, etc.).

An ASIC 174 (what is called a-gate array) performs record control on the recording head 102, and also performs data transfer control among the interface 170, the MPU 171, and the SRAM 173. A carrier motor 179 moves the recording head 102 in the main scanning direction. A transfer motor 178 transfers the record medium in the sub scanning direction. A head driver 175 drives a recording head. Motor drivers 176 and 177 respectively drive the transfer motor 178 and the carrier motor 179.

The outline of the operations according to the above-mentioned control circuit block is described below. That is, when a record signal is input to the interface 170, a record signal is converted into printing record data between the ASIC 174 and the MPU 171. Then, the motor drivers 176 and 177 are driven, and simultaneously the recording head 102 is driven according to the record data transmitted to the head driver 175, thereby performing a recording operation.

Figure 5:
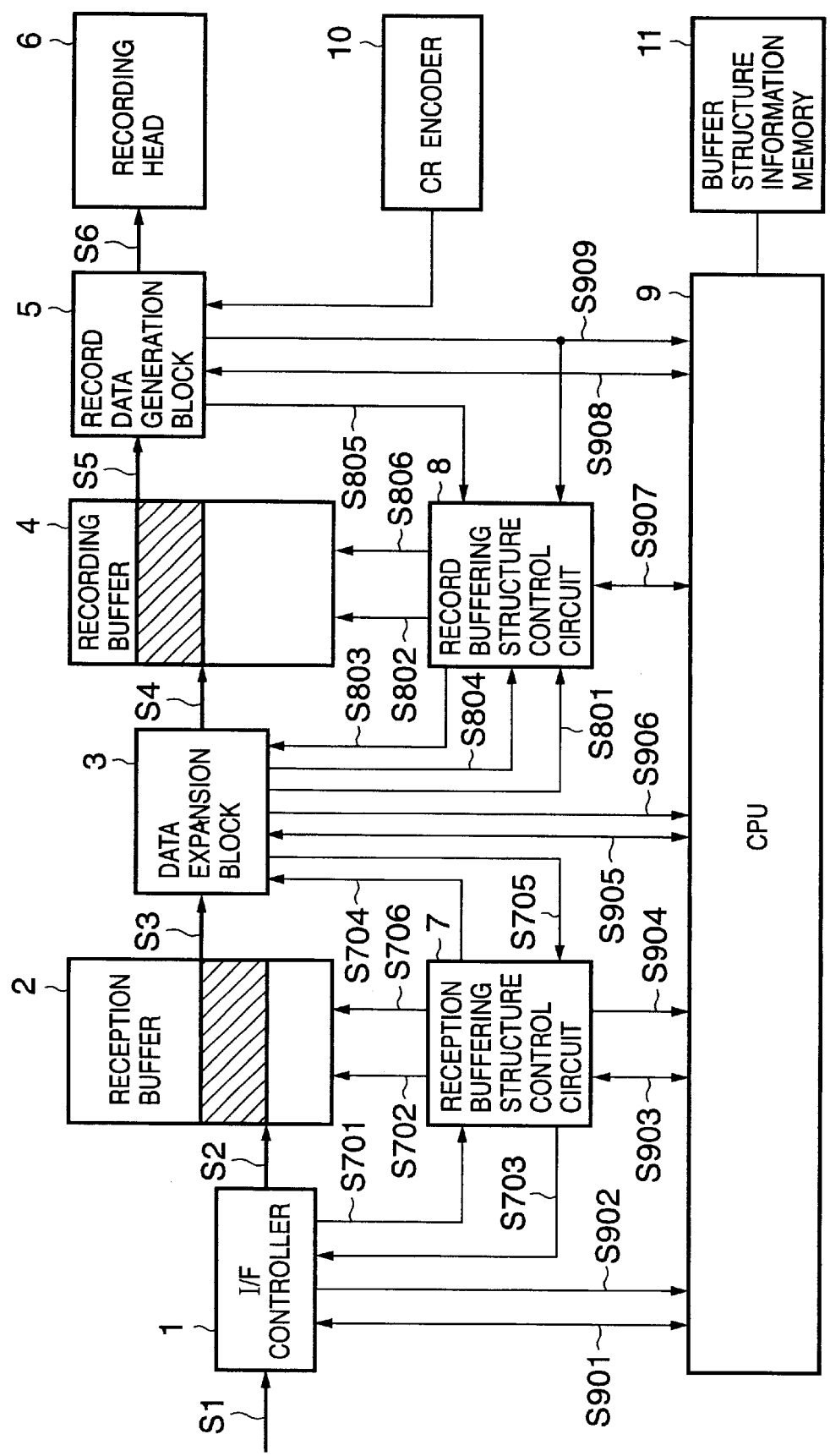
FIG. 5 is a block diagram of the record control unit of the recording apparatus according to an embodiment of the recording apparatus of the present invention.

FIG. 5 is a block diagram of the record control unit of the recording apparatus according to an embodiment of the recording apparatus of the present invention. In FIG. 5, an interface controller 1 receives data transferred from the host computer (not shown in the attached drawings) through an interface signal line S1, extracts necessary data for the operations of the recording apparatus and image data, and temporarily stores the data. The data extracted by the interface controller 1 is stored in a reception buffer 2 through a signal line S2.

Figure 10A:
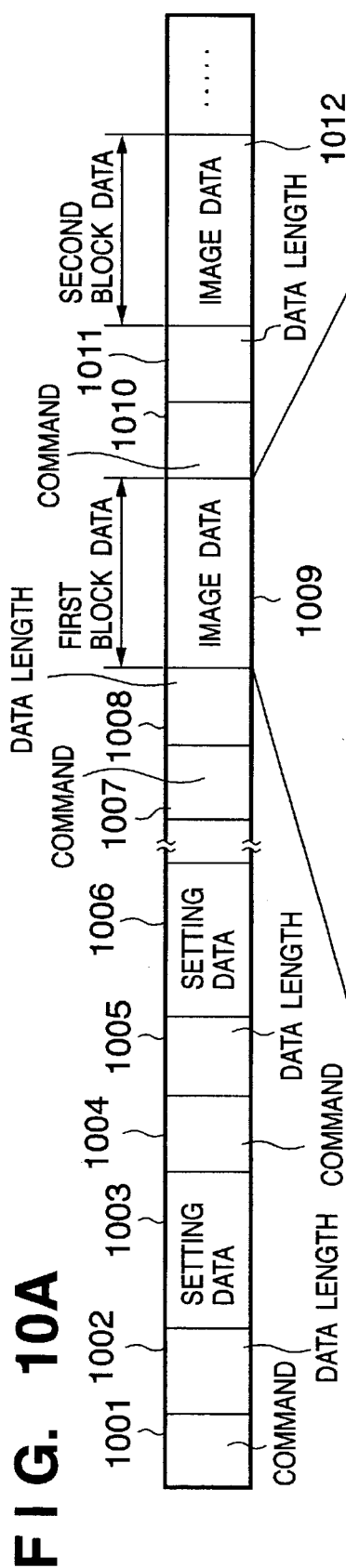
FIGS. 10A and 10B show the data structure of the data transferred from the host computer.
Figure 10B:
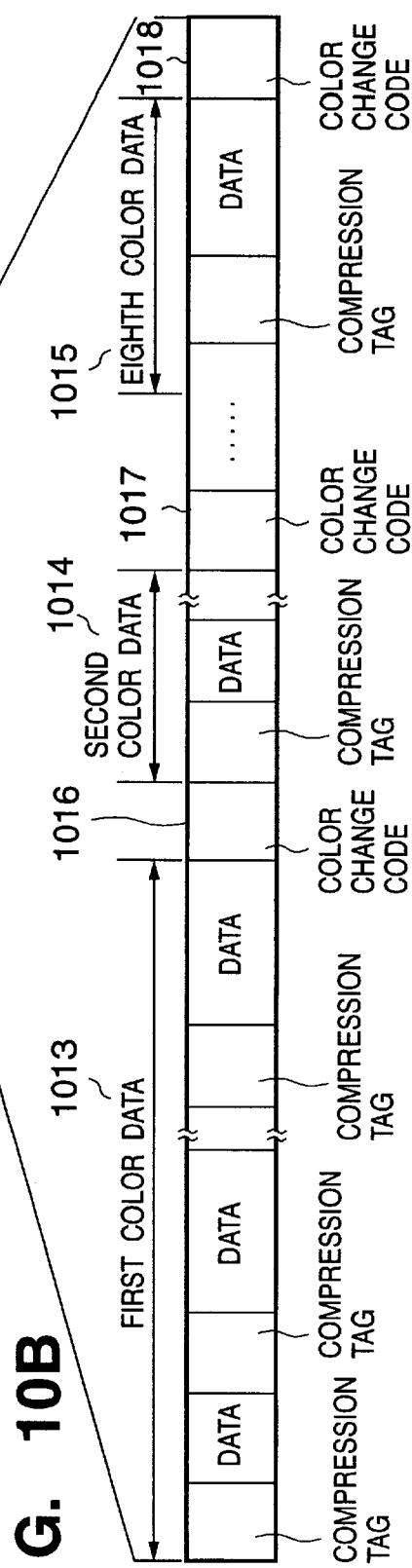

The reception buffer (receive buffer) 2 is configured by a recording apparatus such as SRAM, DRAM, etc., and the data stored in the reception buffer has the structure as shown in FIGS. 10A and 10B.

FIG. 10A shows the contents of the data stored in the reception buffer. In FIG. 10A, the data is stored in the sequence of a "command" (1001), a "data length" (1002), and "setting data" (1003), followed by a "command" (1004), a "data length" (1005), "setting data" (1006) from left to right. The data transferred in a time series are stored at the consecutive addresses in the reception buffer (receive buffer), and the setting data 1006 is the information about the execution of feeding sheets, the setting of sheet feeding, an available recording head, etc., and all information defined by the setting data is required in recording by the recording apparatus. Afterwards, image data (1009, 1012) to be recorded are stored in the reception buffer (receive buffer) 2.

The image data (1009, 1012) are obtained by dividing the data amount required by the recording head recording data in one scanning operation into a smaller amount of data in a block unit. The image data is segmented in the block unit, and is stored sequentially as the first block data (1009), the second block data (1012), . . .

FIG. 10B shows in detail the data structure of the image data divided in a block unit. As shown in FIG. 10B, data (1013 to 1014) of a plurality of colors are sequentially stored as compressed data. The color data is segmented by "color change code" (1016, 1017, 1018).

For example, if the color data of four colors of cyan, yellow, magenta, and black is assumed, and a recording head has a nozzle array of vertical 128 nozzles for each color arranged in the scanning direction, then the data of the compressed first to fourth colors is stored in one data block. Each nozzle of the nozzle array is arranged in the transfer direction of the recorded medium.

If a recording head has two nozzle arrays of the respective vertical 64 nozzles for each color arranged in the scanning direction as another embodiment of a nozzle array, then the two nozzle arrays respectively have two nozzle arrays of four colors respectively, that is, the color data from the first to eighth compressed color data is stored as image data in one block data. For example, the first color and the second color form the data of cyan, the third color and the fourth color form the data of magenta, the fifth color and the sixth color form the data of yellow, and the seventh color and the eighth color form the data of black.

FIG. 11 shows the structure of a recording buffer for holding image data. For example, if the maximum length of 8 inch is recorded in one scanning operation in the scanning direction, a piece of block data can be recorded in 1-inch size in the scanning direction, and a total of 8-block image data is recorded, then an image of one scanning operation is completed.

The first block to the eighth block are arranged in the scanning direction of the recording head, and each piece of block data stores the first color data to the eighth color data. The length of the data of each color stored in each block corresponds to the number of nozzles of the recording head.

For the data of each color, the vertical length of each block (height of block) corresponds to the number of nozzles.

Back to FIG. 5, each control block is explained below. In the data stored in the reception buffer 2, the "command", "data length", and "setting data" which are the set values for control of the recording apparatus are read from the interface controller 1 to a CPU 9 through the signal line S902, and set in each control circuit (7, 8) shown in FIG. 5 (S903, S907). The CPU 9 interprets the read data (data corresponding to 1001 to 1008 shown in FIG. 10A), and totally controls the record of the recording apparatus based on the interpretation result. On the other hand, the CPU 9 activates a data expansion block 3 for processing image data.

The data expansion block 3 reads three types of data, that is, "compression TAG", "data", and "color change code" shown in FIG. 10B, from the reception buffer 2, and performs data expanding control based on the read data. According to the present embodiment, PackBits compression is used as a data compression/decompression method. Therefore, when the compression TAG is 8 bits from 00 h to 7F h, the process is performed with 1 to 128 pieces of nonconsecutive data assumed to be stored in the data area, and when the compression TAG is 8 bits from FF h to 81 h, the subsequent 1-byte data is decompressed into 2 to 128 consecutive data. When 80 h is read at the compression TAG, it is processed as a color change code. The decompressed data is transmitted through a signal line S4, and written to the recording buffer 4.

The recording buffer 4 stores decompressed image data in the data structure shown in FIG. 11. At the leading address of the recording buffer 4, the leading data of the first color data in the first block is written, and the subsequent data is sequentially written with one address added. The area storing color data at the address of the recording buffer can be determined by the setting data first read by the CPU 9, and no data exceeding the value can be written. Therefore, when image data is compressed, restrictions on data size are placed depending on the setting data. The data after detection of a color change code is sequentially written from the leading address of the second color data. The control of the address data is performed by the record buffering structure control circuit 8 described later.

The writing operation is repeated from the first color data to the eighth color data in the first block. When the eighth color data is completely written and a color change code is detected, the data in the first block is completely written. The data expansion block 3 completes the data expanding operation, notifies by interruption (INT 1) the CPU 9 of the completion of the data expansion for one block, and awaits the activation of the next data expansion by the CPU 9. The interruption (INT 1) is used in determining whether or not it corresponds to the trailing block data shown in FIG. 6.

When a plurality of blocks of image data are prepared in a recording buffer 4, the CPU 9 operates the carrier motor 179 to start the recording operation, transfers and records the image data in synchronization with a carriage encoder (CR encoder) 10 while a recording head 6 is scanning data, and completes an image on the recording sheet (recorded medium). After the recording head 6 scans data in the main scanning direction, the carrier means transfers the recorded medium in the sub scanning direction. Thus, the scanning of the recording head and the transfer of the recorded medium are repeatedly performed to record an image of one page.

The record data generation block 5 reads each block structure of the image data in the recording buffer 4 at a timing in synchronization with the CR encoder 10 through the signal line S5 based on the value specified by the CPU 9, and outputs the read data to the signal line S6 while converting the data into the data structure recordable by the recording head 6. The record data generation block 5 holds the information about the block width in the recording buffer (indicating the length of a block) described later, and the information about the height of each color of the block (referred to as the "number of rasters" of color data).

<Write/Read Control of Reception Buffer>

The interface controller 1 writes data to the reception buffer 2, and the data expansion block 3 reads only image data. A reception buffering structure control circuit 7 controls the write address and the read address in this process. The reception buffering structure control circuit 7 manages the leading address and the trailing address, and the write address and the read address.

The reception buffering structure control circuit 7 adds one address each time a write request signal (S701) is received from the interface controller 1, and outputs the result as the information about a write address to the reception buffer 2 (signal line S702). Then, when the trailing address of the reception buffer 2 is reached, the reception buffering structure control circuit 7 returns the write address to the leading address of the reception buffer 2.

When the write address reaches (matches) the read address, the reception buffering structure control circuit 7 notifies the interface controller 1 through the signal line S703 that the reception buffer 2 is full of data and no more data can be written.

At this time, it simultaneously notifies the CPU 9 using the interrupt signal of the signal line S904 that the reception buffer 2 cannot receive any more data to be written. The structure of the reception buffer 2 can be set by the CPU 9 writing the setting through the bus of the signal line S903.

A read address can be output to the reception buffer 2 by adding one address through the signal line S706 as a read address when the CPU 9 reads data in the reception buffer 2 directly through the data read register in the reception buffering structure control circuit 7, or when the data expansion block 3 requests it through the data read request signal line S705.

When the read address reaches the trailing address, the reception buffering structure control circuit 7 returns the read address to the leading address of the reception buffer 2. When the read address reaches (matches) the write address, no data is stored in the reception buffer, and the reception buffering structure control circuit 7 notifies the data expansion block through the signal line S704 that the subsequent data cannot be read. Simultaneously, the notification that there is no data to be read in the reception buffer 2 is transmitted to the CPU 9 through the interrupt signal of the signal line S904.

Described above is the process of writing and reading data to and from the reception buffer 2. Described below is the process of writing data read from the reception buffer 2 and expanded to a recording buffer, or reading data from the recording buffer.

<Write/Read Control of Recording Buffer>

The data expansion block 3 writes image data to the recording buffer 4, and the record data generation block 5 reads the written image data. In this process, the record buffering structure control circuit 8 controls the write address and the read address.

The record buffering structure control circuit 8 manages the leading address and the trailing address of the recording buffer, and the write address and the read address.

The record buffering structure control circuit 8 adds one address each time a write request signal (S801) is received from the data expansion block 3, and outputs it as the information about the write address to the recording buffer 4 (signal line S802). Then, the record buffering structure control circuit 8 returns the write address to the leading address of the recording buffer 4 when the trailing address of the recording buffer 4 is reached.

Furthermore, then the write address reaches (matches) the read address, the recording buffer 4 is full of image data, and the data expansion block 3 is notified of the information through the signal line S803 that the subsequent image data cannot be written.

When the data expansion block 3 reads a color change code from the reception buffer 2, the data expansion block 3 transmits the information through the signal line S804, and the record buffering structure control circuit 8 prepares the leading address for the subsequent color data to be output through the signal line S802. The structure of the recording buffer 4 can be set by the CPU 9 writing it to the internal register through the signal line S907.

When the record data generation block 5 requests the read address for each color through the data read request signal line S805, one address is added to the read address, and the resultant read address is output to the recording buffer 4 through the signal line S806.

When the read address reaches the trailing address, the record buffering structure control circuit 8 returns the read address to the leading address of the recording buffer 4.

The record data generation block 5 sets the data structure of the image data block currently being read in the register in the record data generation block 5 from the CPU 9 through the signal line S908. When the image data in the set structure of the image data block are all read, the termination signal S909 is transmitted as an interrupt signal to the CPU 9. At this time, if the subsequent image data block has already been expanded in the recording buffer 4, then the structure of the image data block is written to the register.

The recording buffer 4 controls the writing of data in an image data block unit, and does not activate the record data generation block for an unwritten image data block. Therefore, the read address of the recording buffer does not exceed the write address. A buffer structure information memory 11 is a work memory (work RAM) for control of the recording buffer, and temporarily stores the information about a recording buffer structure described later.

Described above is the outline of the flow of record data in the record control unit.

<Explanation of the Record Buffering Structure Control Circuit>

The record buffering structure control circuit is described below by referring to FIGS. 8 and 9. In the process performed by the record buffering structure control circuit 8, FIG. 8 mainly shows the control of a write address, and FIG. 9 mainly shows the control of a read address of the record buffering structure control circuit 8.

The record buffering structure control circuit 8 is configured by a read address control unit 8A and a write address control unit 8B. Relating to the buffer area of the recording buffer 4, the leading address of the recording buffer is indicated by top_adr, and the trailing address is indicated by bottom_adr. The leading address is stored in a register 803 in the write address control unit 8B, and the trailing address is stored in a register 804 in the write address control unit 8B.

The "RP" in the recording buffer 4 indicates a read pointer, and the "WP" indicates a write pointer. The hatching portion between the RP and the WP of the recording buffer indicates that record data is stored. The white portion of the recording buffer 4 indicates that no record data is stored.

A register 802 in the read address control unit 8A is a register indicating the read address (RP: read pointer) of data. Registers 805 to 812 store the information about each of the first color to the eighth color. The register 805 stores the height information about the buffer of the first color data and the information about the presence/absence of the first color data. Similarly, the registers 806 to 812 store the information about the second color to the eighth color.

A register 813 sets the width information about a block. The width information is commonly used for the first color to the eighth color in a block unit.

The height information and the width information about a block data are included in the setting data described above by referring to FIG. 10A.

A register 815 stores the address of the next block data, and the address can be determined using any value of the register 805 to register 812 storing the information about each color, and the value of the register 813 storing the width information about block data.

A write address register 816 stores a data write address. An address control register 814 manages a write process and a read process such that a write address does not exceed a read address (such that both addresses cannot be the same).

<Explanation of Read Address Control Unit>

In FIG. 9, the left portion shows the read address control unit 8A of the record buffering structure control circuit 8, and the right portion shows the recording buffer 4.

Figure 8:
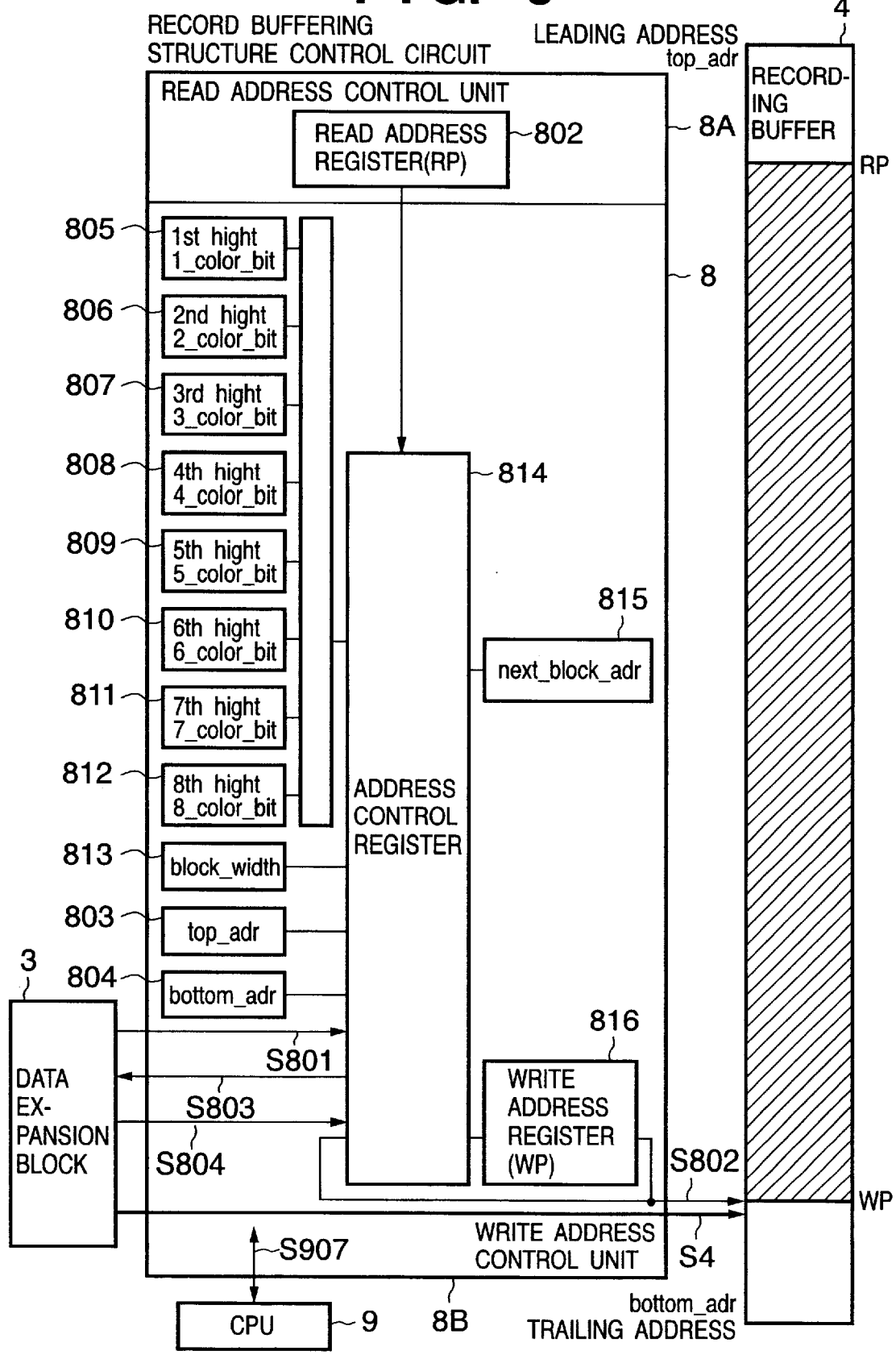
FIG. 8 shows the details of a write address control unit of a record buffering structure control circuit in the recording apparatus according to an embodiment of the present invention.

The buffer area of the recording buffer 4 is represented by top_adr which is the leading address of the recording buffer and bottom_adr which is the trailing address as shown in FIG. 8. The leading address (top_adr) is stored in the register 803, and the trailing address (bottom_adr) is stored in the register 804. The "RP" in the recording buffer is a read pointer as shown in FIG. 8, and the "WP" is a write pointer. The hatching portion between the RP and the WP in the recording buffer 4 indicates that record data is stored. The white portion of the recording buffer indicates that no record data is stored.

The register 802 in the read address control unit 8A indicates a data read address (RP: read pointer). A first register group 900 is enclosed by a frame of broken lines, and a second register group 901 is enclosed by a frame of solid lines.

When the image data from the first block to the eighth block is recorded, for example, the first register group stores the information about the first block when the scanning is started. The second register group stores the information about the second block. When the recording of the first block is completed, the information about the second register group 901 is copied to the first register group 900, and the first register group 900 stores the information about the second block. Then, the second register group 901 stores the information about the third block. Likewise, the process sequentially continues until the data of the trailing eighth block is stored. When the next scanning is started, the first register group stores the information about the first block, and the second register group stores the information about the second block.

A register (1st_height 1 color bit) 819 in the first register group sets the presence/absence information about the height information and the color data of the first color. Each register 822, 824, 826, 828, 830, 832, or 834 sets the presence/absence information about the height information and the color data of the second color to the eighth color.

A register 820 stores the width information about each block data. The width information is commonly used in a block unit from the first color to the eighth color.

A register (1st_color_adr) 818 stores the read address of the first color. When data is read from the recording buffer 819 storing the data of the first color, the address is updated. The registers 821, 823, 825, 827, 829, 831, and 833 store the read addresses of the second color to the eighth color, and the color data of one column is read for the second color to the eighth color as in the case of the color data of the first color.

Since the data stored in the recording buffer 4 includes the data of a plurality of colors, the addresses at which the color data are stored are not consecutive when, for example, the color data of the first color, the second color, . . . exist in a mixed manner. Therefore, if there is one register of a read address for each piece of color data, it is necessary to compute the address when the second color data is read after the address of the first color data. However, by preparing a register for storing a read address for each color in the recording buffer 4, the address computation to be performed when data is read in a column unit can be omitted.

Reference numeral 817 denotes an address control register. When the record data generation block 5 requests a read address for each color through the data read request signal line S805, the address control register 817 adds one address and outputs the resultant read address to the recording buffer 4 through the signal line S806.

A register 835 stores the address of the next block. If the currently read block is the first block, then the register stores the leading address of the second block. The value of the register is copied to the register 802 when the currently read block data is completely read. Thus, the next block diagram can be smoothly read.

A register 836 is a table storing the information for specification of the reading order of the first color to the eighth color. In accordance with the value set in the table, the reading order of data from the recording buffer can be freely set. For example, in the case shown in FIG. 4, the colors are read in the order of first color→second color→third color→fourth color. When there are eight colors, they can be read in the order of first color→second color→ . . . →eighth color. The values can be changed into first color→second color→fifth color→sixth color→seventh color→eighth color by skipping the third and fourth colors. Thus, the image data in which some colors are omitted can be correctly omitted in a reading operation.

The second register group 901 is a group of buffers storing setting data relating to the subsequent block data. When each register of the first register group is read, the value set in each register of the second register group is set in the corresponding register in the first register group. For example, the value set in a register 838 is set in the register 819. Registers 839 to 845 are registers in which similar information about the color data of the second color to the eighth color is set.

The register 838 stores the height information about the buffer of the first color data, and the information about the presence/absence of the first color data. The registers 839 to 845 are registers in which similar information are set about the second color to the eighth color.

A register 846 is a register in which the width information about a block is set as in the register 820. The width information is commonly used in a block unit from the first color to the eighth color.

When the size of a block is the same as the size of the previously set block, the value is set to "1" in a register 878 to set the same value in the first register group. In this case, the settings of the registers 838 to 846 can be omitted. When the value of the register 878 is "0", the respective values are set in the registers 838 to 846. The register (same_type) 878 can easily set the register if the block sizes are the same.

Described above, is the process of data writing/reading-out control of record data.

Figure 3:
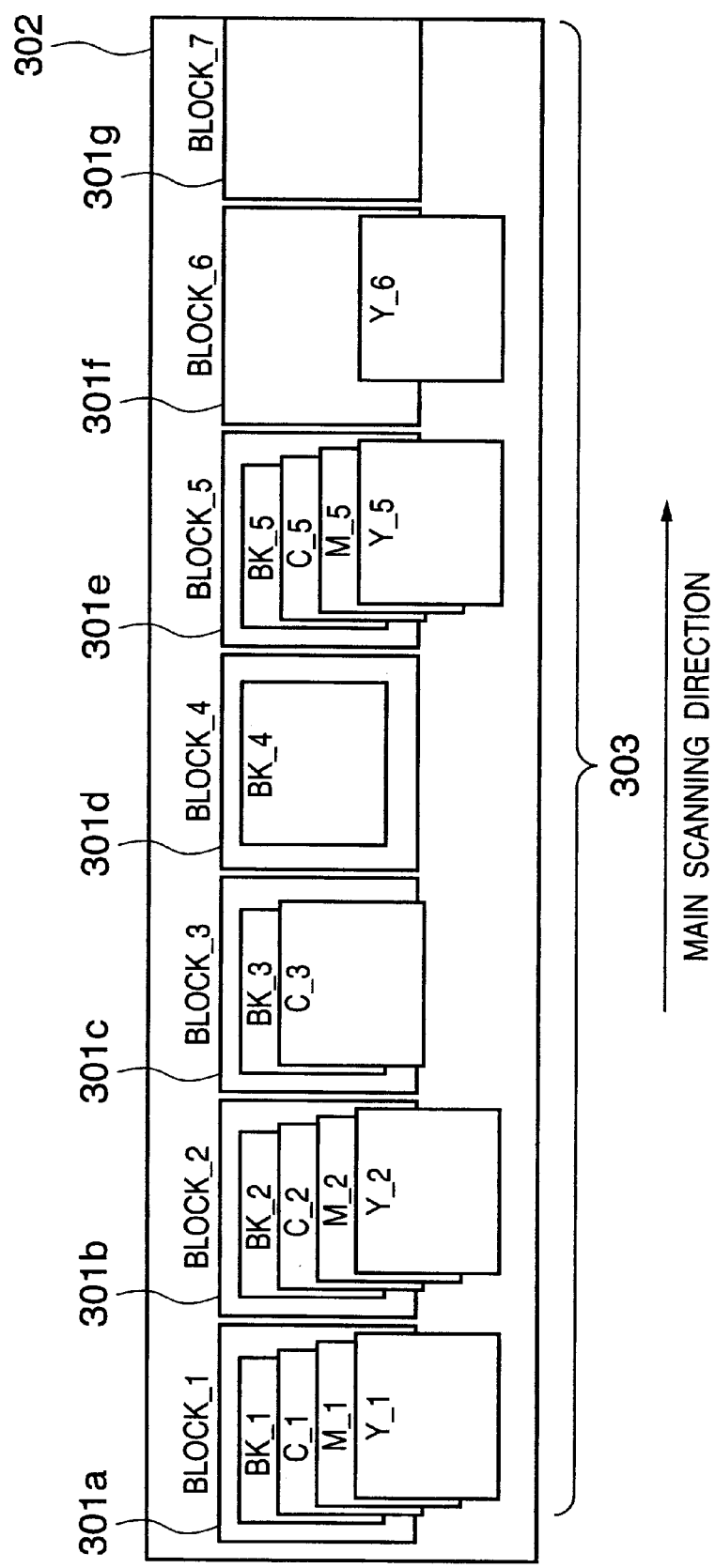
FIG. 3 shows the outline of the configuration of the record data in the scanning direction of a record medium 106 according to an embodiment of the present invention.

In FIG. 3, the reference numerals 301a to 301g show the correspondence between the record data block (BLOCK_1 to 7) to be recorded in the main scanning direction to the record medium 106 and a one scanning data record area 302. By performing the record of each block data to the record medium 106, the record of the one scanning data record area 302 is completed. For the record of the one scanning data record area 302, the recording buffer for temporarily storing the data to be recorded is divided into a plurality of portions in the main scanning direction in the present embodiment. To use and manage the plurality of recording blocks, a table 303 for specification of the data structure for management of the recording buffer 4 as shown in FIG. 3 can be used. In this case, each column 301a to 301g of the recording buffer management table 303 stores the information (BK_1, C_1, . . . ) about the color data stored in the blocks, presence/absence information about color data, the number of columns of a block of each color data, the available nozzle position, etc.

<Address Control of Recording Buffer>

Figure 4:
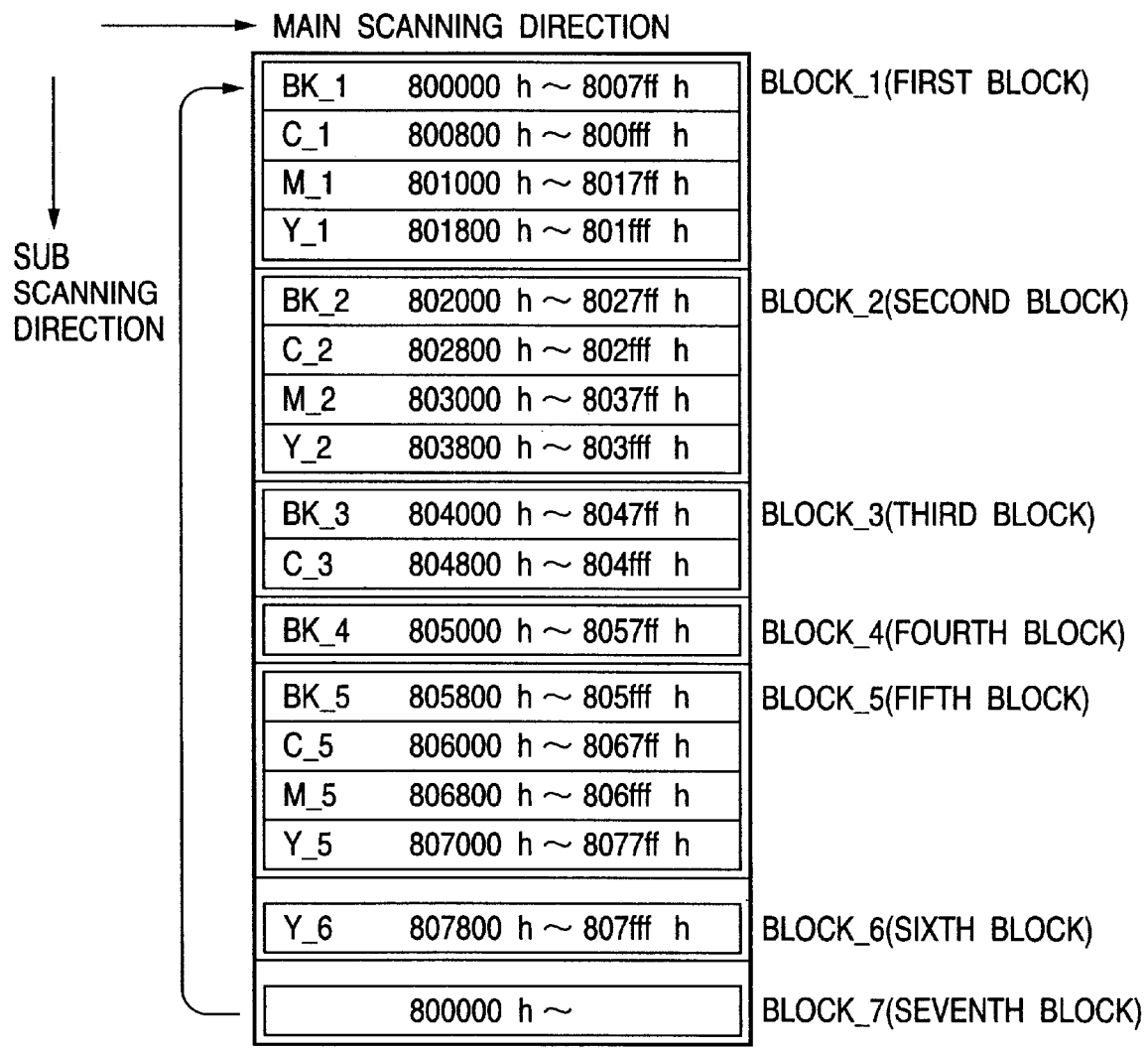
FIG. 4 shows the data arrangement of the recording buffer according to an embodiment of the present invention.

FIG. 4 shows an example of an internal configuration of the storage of block data in a recording buffer. In this example, for simple explanation, there are seven recording blocks (BLOCK_1 to 7, each value is an identification ID of a block), four pieces of color data stored in the first recording block (BK_1, C_1, M_1, Y_1, each value is an identification ID of color data), four pieces in the second block, two pieces in the third block, one piece in the fourth block, four pieces in the fifth block, one piece in the sixth block, and zero piece in the seventh block. That is, a total of 16 pieces of color data are stored. The recording buffer has a memory capacity (1024 words) storing 128 dots in the main scanning direction of data of 16 bits×8 (8 words) in the vertical direction (sub scanning direction). Therefore, 128 nozzles arranged at intervals of 600 DPI can record the data of 128 columns.

Therefore, as in the present embodiment, the number of columns per block is set as 128 columns, and one block of data is to be recorded in four colors using the recording head having 128 nozzles per color, four divided recording buffers, that is, 1024×4 words are assigned to a storage area for storing them as a block data.

Relating to the address of the recording buffer, the memory address of the SRAM 173 "800000 (h: hexadecimal representation)" is a starting address, 2048 bytes are a basic unit, the area of the SRAM 173 is divided, and a storage area for each color data of each block is assigned.

From the correspondence between the color data and the block data in identification ID, BK_1 indicates the color data of black in the first block, the leading address of the storage area is 800000 (h) for black, 800800 (h) for cyan (C_1), 801000 (h) for magenta (M_1), and 801800 (h) for yellow (Y_1). The first block stores the data for four colors.

Similarly, in the second block, the leading address of the storage area of the color data (BK_2) of black is 802000 (h), 802800 (h) for cyan (C_2), 803000 (h) for magenta (M_2), and 803800 (h) for yellow (Y_2). The data of four colors are stored in the second block as in the first block.

In the third block, the leading address of the storage area of the color data (BK_3) of black is 804000 (h), and 804800 (h) for cyan (C_3). Therefore, the third block stores the data of two colors of black and cyan. That is, it contains no image data of magenta and yellow. Therefore, no recording buffer is assigned to them.

In the fourth block, the leading address of the storage area of the color data (BK_4) of black is 805000 (h). Therefore, the fourth block stores the data of one color, black. Since there are no image data for the other colors, cyan, magenta, and yellow, a recording buffer is not assigned to them.

In the fifth block, the leading address of the storage area of the color data (BK_5) of black is 805800 (h), 806000 (h) for cyan (C_5), 806800 (h) for magenta (M_5), and 807000 (h) for yellow (Y_5). In the fifth block, as in the first and second blocks, the color data of four colors are stored.

In the sixth block, the leading address of the storage area of the color data (Y_6) of yellow is 807800 (h). In this block, since there are no corresponding image data for black, cyan, and magenta, a recording buffer is not assigned to them.

To cyclically use the storage area of data using the SRAM 173 as a recording buffer, the leading address of the area indicated as the seventh block is the leading address 800000 (h) of the area available after recording the image data in the first block.

As described above, only the image data to be recorded in different storage areas is packed and stored in the divided recording buffers (when there are no image data, no areas for storing data are reserved), thereby efficiently utilizing the memory.

On the other hand, to manage the order of the recording blocks (1 to 7) used in recording data, the SRAM 173 includes a recording block ID number storage area for management of the ID number of the next available recording block. The ID number stored in the recording block ID number storage area is sequentially updated by recording the recording block of the recording buffer, and the ID number of the next available recording buffer can be constantly set. Using the ID number, the recording block to be next read can be specified, and the subsequent block data can be sequentially stored in the recording block for which the recording has been completed.

Thus, the recording block data to be written in the recording block area can be constantly managed during recording. Then, during a series of recording operations, the information is stored in the SRAM 173. During the recording operation, the address in the recording buffer at which data is to be written can be appropriately managed. The write and read of record data are controlled cyclically using the recording buffer during the recording operation.

<Process of Recording Control>

Figure 6:
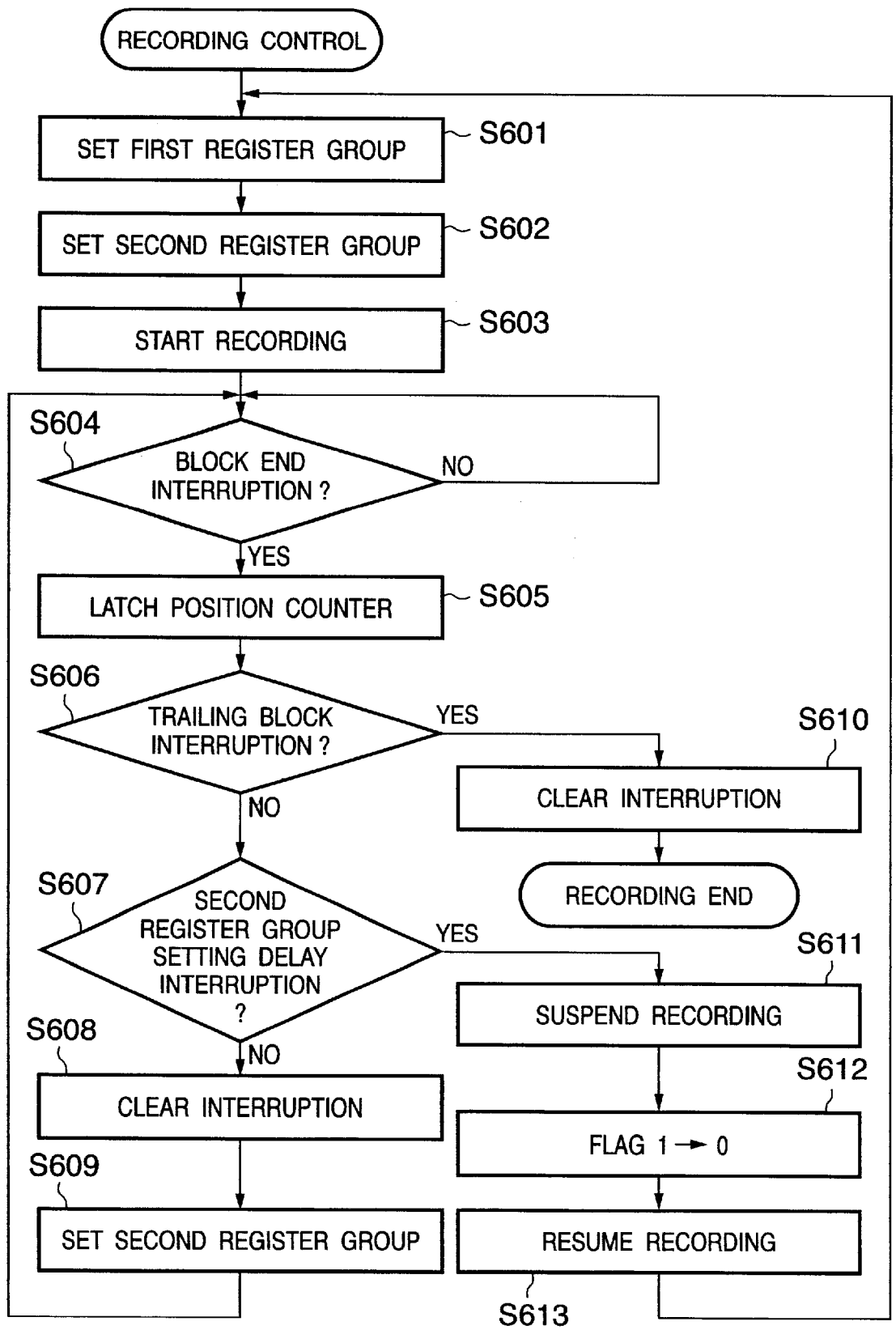
FIG. 6 is a flowchart of the record controlling step of the recording apparatus according to an embodiment of the present invention.

FIG. 6 shows the flow of the recording control. In step S601, the first register group (configured by a plurality of registers) is set to read the image data from the recording buffer. In setting the first register group, the setting data such as the presence/absence of color data in the first block, the number of nozzles, the number of columns, etc., is set. For example, as shown in FIG. 4, since the first block stores the image data of all of the four colors, the information indicates that all color data are contained. The first register group corresponds to the first register group 900 described above by referring to FIG. 9.

In step S602, the second register group (configured by a plurality of registers) is set. In setting the second register group, the setting data such as the presence/absence of color data in the second block, the number of nozzles, the number of columns, etc. is set. Each register of the first register group corresponds to each register in the second register group, and the value set in the second register group is copied to the first register group according to the interrupt signal. Therefore, the setting can be easily performed. When the data of the third block shown in FIG. 4 is set, the no-color information is set in the registers of magenta (M) and yellow (Y) because no data is stored for magenta (M) and yellow (Y).

In step S603, the recording operation is started. The image data in each block is read according to the address information (818, 821, 823, 825, 827, 829, 831, and 833 shown in FIG. 9), and the record data generation block 5 generates record data according to the setting data stored in the first register group 900. For example, the carriage starts scanning data, accelerates the scanning up to the start of the storage area, and then moves at a constant speed. When the carriage reaches the record starting position, recording the image data stored in the first block is started. Therefore, to process the record data, the data is completely prepared before the carriage reaches the record starting position.

In step S604, the presence/absence of the interrupt signal indicating the end of record of the data stored in the first block is checked. If the interrupt signal occurs(YES in S604), then the image data currently stored in the first block is completely recorded, and the data stored in the second register group is copied to the first register group, thereby performing the next recording process.

On the other hand, the recording buffer corresponding to the first block in which the recording operation is completed stores the data of the next block. In the present embodiment, the data up to the sixth block is stored in the recording buffer as shown in FIG. 4. Therefore, the data in the seventh block is stored in the blank area of the first block.

In step S605, the position counter is latched. The value of the position counter is the position information of the carriage obtained from the encoder. The position information is the column information about the image data stored in the recording block, and corresponds to the information in a pixel unit.

In step S606, it is checked whether or not the data corresponds to the trailing block of the image data. If it does not correspond to the trailing block (NO in S606), then control is passed to step S607. If it corresponds to the trailing block (YES in step S606), then one scanning operation of the recording process is completed, and the interrupt signal of the trailing block received in step S606 is cleared (S610), thereby terminating the recording process.

In step S607, it is checked whether or not there arises a setting delay interruption of the second register group. The interruption occurs when the carriage moves to the recording position (in which the carriage reaches the record starting position), and the reading of record data from the recording buffer cannot be in time for the record timing. According to the present embodiment, the presence/absence of a second register group setting delay is determined by checking whether or not the second register group setting delay flag which is referred to in the block end interruption indicates "1". If there is no setting delay, the flag indicates "0".

When data is set in the second register group, the second register group setting end flag is set to "1" in the process by software under the control of the CPU 9, and when the data in the second register group is copied to the first register group, the flag is changed into "0". Changing the second register group setting end flag into "0" is performed by hardware.

The second register group setting delay flag is changed based on the second register group setting end flag. When a block end interruption occurs, the second register group setting delay flag indicates "0" when the second register group setting end flag indicates "1". If the second register group setting end flag indicates "0", then the second register group setting delay flag indicates "1". Therefore, when the second register group setting delay flag indicates "1", the block data to be recorded next cannot be read from the recording buffer 4.

If a second register group setting delay interruption (when the above-mentioned flag indicates 1)(YES in S607) occurs, then the image data currently being set in the first register group is recorded, the next block is not recorded, and the recording process is suspended (S611). For example, if the recording is suspended after recording the third block, then the position counter latched in step S605 stores the position information about the carriage corresponding to the trailing column in the third block, and the recording operation is suspended. At this time, the operation of the carriage is decelerated from the constant speed movement, the movement is stopped and then recovered to the origin in the scanning direction, and to the record starting position.

Then, the CPU 9 monitors the set value of the above-mentioned flag. When the CPU 9 detects that the flag indicating the second register group setting delay is suspended at "1" (S611), then the second register group setting delay flag is cleared from "1" to "0" (S612). The clearing is performed by software under the control of the CPU 9. Then, the CPU 9 controls the recording head 6 to start scanning data again (S613). The recording is resumed from the position in which the recording has been suspended by scanning the recording head in the scanning area (without transfer in the sub scanning direction) in which the scanning has been performed before it is suspended. In this case, since the recording has been performed up to the third block, the recording is resumed from the fourth block. When the recording is resumed, the value of the position counter before the suspension is maintained, and the value is used to guarantee the continuation of the recording position. Thus, when the recording is once suspended, the one scanning area can be recorded in two scanning operations.

If there is no second register group setting delay in step S607 (the above-mentioned flag indicates 0), the interrupt signal is cleared in step S608.

In step S609, the second register group is set again. In the second register group in which a blank area can be obtained by copying the contents of the stored data to the first register group, the setting data of the third block is set, and control is passed to step S604.

In step S604, if a block end interruption occurs, the setting data of the third block set in the second register group in step S609 is copied to the first register group, and the subsequent recording process is performed.

The data is processed according to the flowchart shown in FIG. 6 until the end of the trailing block.

<Explanation of Resuming Record>

Figure 12A:
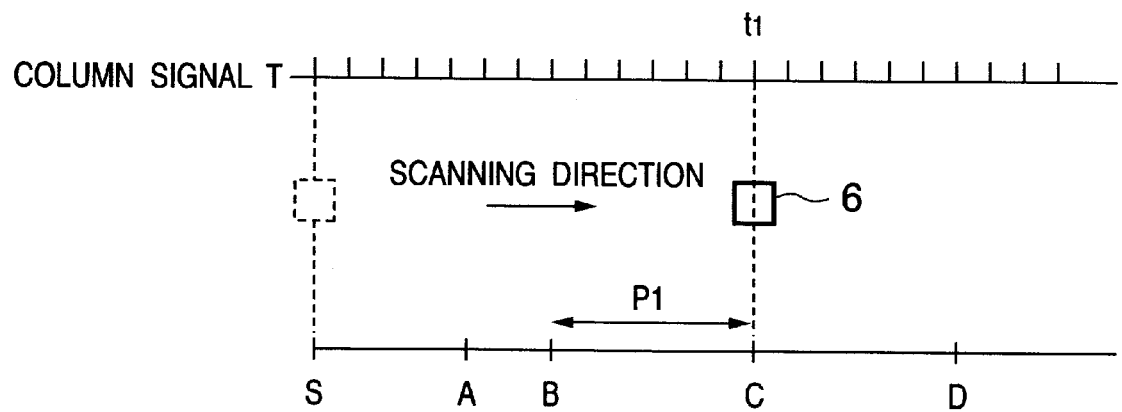
FIGS. 12A and 12B show the process of a recording operation performed when record data cannot be stored in time for the recording process.
Figure 12B:
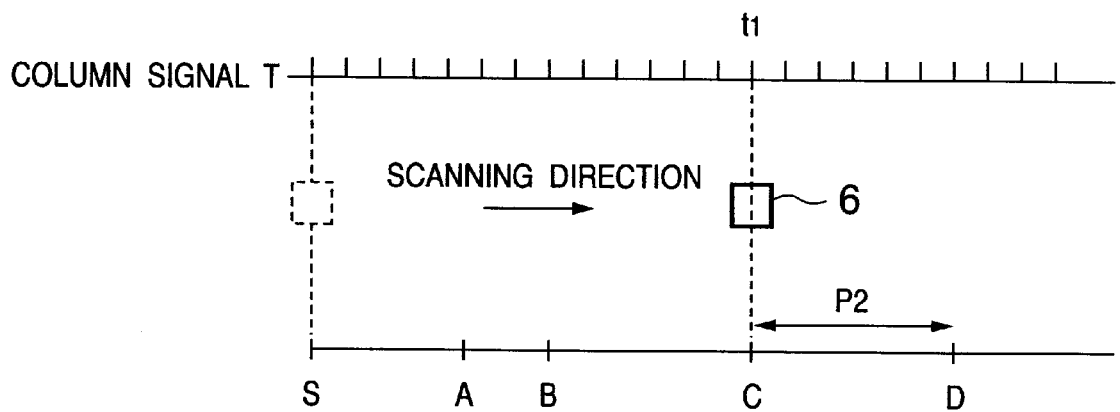

FIGS. 12A and 12B show the recording operation performed when the storage of record data cannot be in time for the recording timing (when the second register group setting delay flag indicates 1 in the flowchart shown in FIG. 6).

The recording head 6 moves in the scanning direction indicated by the arrow from the starting position S, and data is recorded. The control of the position of the recording head 6 is performed according to the column signal T. The scanning starts from the starting position (stop state), the recording head 6 is accelerated, and the acceleration stops in the position A, for example, and the recording head 6 moves at a constant speed. When the recording head 6 transitions to constant speed movement and the storage of the record data can reach the record starting position in time, data can be recorded from the position A to the position D (the area between A and D is a constant speed movement area) corresponding to the entire area of one scanning area.

FIG. 12A shows starting recording from the position B to the position C, that is, recording in the area P1. Since the record data cannot be stored until the recording head reaches the record starting position, the data is recorded only to the position C. The range of the record is captured by the encoder signal process block in the ASIC 174 according to the column signal T, and the recording timing t1 is stored in the resistor in the ASIC 174 for resumption of the record. As shown in FIG. 12B, the scanning is started again from the starting position S, and the recording is performed at the recording timing t1. Under the control, the recording can be resumed from the position C where the recording is suspended, the recording can be performed in the area P2 to the position D, thereby completing the record in the scanning direction.

FIG. 13 shows the signal relating to the encoder signal process block in the record data generation block 5.

A column signal is generated by equally dividing an encoder signal (having the resolution of one pixel). The column signal is counted by a column counter 1401 shown in FIG. 14. According to the column signal, the image data of each column is read.

In the case of the recording head having two nozzle arrays for each color, the image data from the first color to the eighth color of each column is sequentially read. In the case of the recording head having one nozzle array for each color, the image data in the first color to the fourth color is read. The reading process is performed according to the DMA_REQ signal and the DMA_ACK signal. In one cycle of the DMA_ACK signal, the data of one nozzle array is read in four operations (a to d) in this figure. Using one nozzle array having 64 nozzles, the data of 16 nozzles can be read in one reading operation. That is, for the image data a, the data from the first nozzle to the 16th nozzle are read. For the image data b, the data from the 17th nozzle to the 32nd nozzle are read. For the image data c, the data from the 33rd nozzle to the 48th nozzle are read. For the image data d, the data from the 49th nozzle to the 64th nozzle are read. Similarly, if the number of nozzles in one column is 128, then the data can be read in eight operations.

In the case of the data reading timing being the column signal timing T8, the timing of driving the recording head for the read data is based on the column signal T9 after one clock. That is, the image data is read at the timing T8 of the column signal, and the ink is jetted (recorded) to the data read at the timing T9 of the column signal.

The DMA_REQ signal is the data read request signal line S805 described in FIGS. 5 and 9. In response to the signal, the DMA_ACK signal S8051 shown in FIG. 9 is returned to the record data generation block. The image data is shown in S5 in FIG. 9, and transferred in the DMA transfer from the recording buffer 4 to the record data generation block 5.

Figure 14:
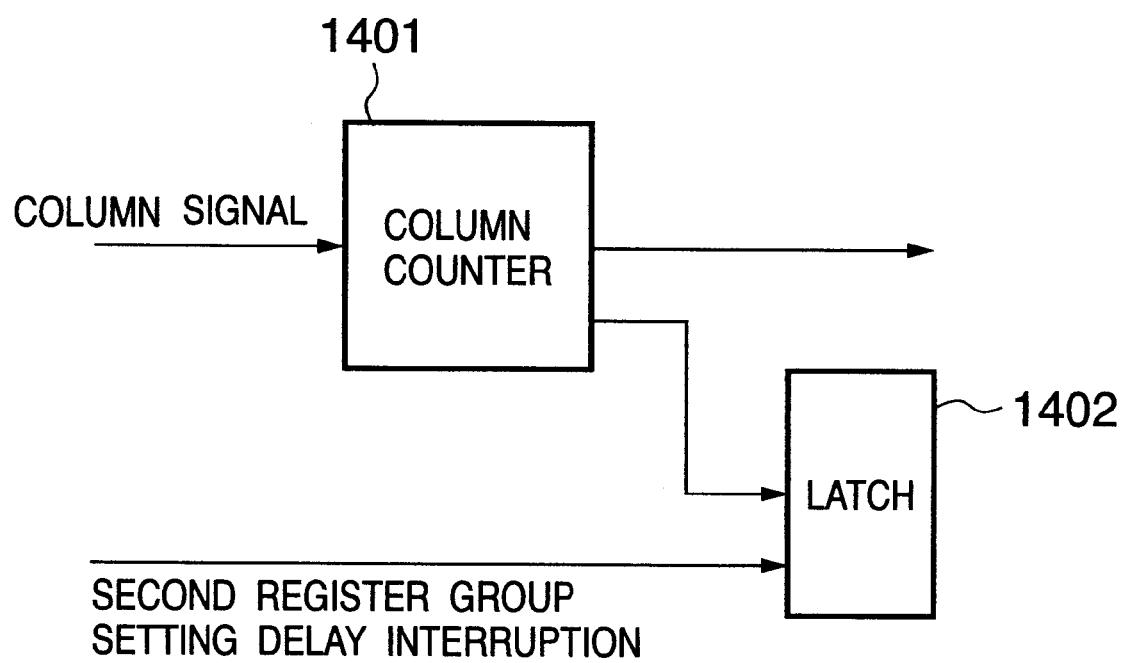
FIG. 14 shows a circuit for counting a column signal.

FIG. 14 shows the circuit for counting the column signal. The circuit is configured by the column counter 1401 and a latch circuit 1402. The column counter counts up the column signal shown in FIG. 13. The count-up value is output to the latch circuit 1402. When a signal without image data is input, the latch circuit 1402 holds the count-up value without adding the count.

For example, by referring to FIG. 13, when a no-image signal is input at the timing of the column count of 8 (when the second register group setting delay flag indicates 1 in the flowchart shown in FIG. 6), the value of the count 8 is latched at the timing T8 of the column count. The value of 8+1 (ninth column) (ninth column when 1 is added in the forward direction, and seventh column when 1 is decreased in the reverse direction) is used as the first column of the next record starting position (record starting column).

In the present embodiment, the explanation is given with the structure of the recording head having nozzles recordable for 16-bit data for each color element in the sub scanning direction. However, the present invention is not limited to this application. For example, the nozzle size can be any of 8 bits, 16 bits, 32 bits, etc. only if the size is suitable for easy access from the MPU.

Furthermore, according to the present embodiment, the management table is smaller than the record medium. However, the present invention is not limited to this configuration. For example, the management table can be larger than one page with efficiency. Additionally, the present embodiment does not limit the number of recording buffers or the size of the recording buffer. They can be variable depending on the configuration of the apparatus, etc.

As described above, according to the recording apparatus and the method for controlling a recording apparatus, color data including a plurality of colors can be written to and read from the buffer in a block unit. In the control, data is divided into a plurality of recording blocks, and each recording block can be managed in a recording operation. Therefore, the recording buffer required in a recording operation can be smaller, and the buffer area can be efficiently used.

Furthermore, although the recording is suspended because the storage of record data is not in time for the recording operation, the recording position can be controlled according to the scanning position information obtained by the position detection means, thereby successfully resuming and completing the recording in the scanning direction.

The present invention comprises means (for example, an electro-heat conversion member, a laser light, etc.) for generating heat energy for use in jetting ink in the inkjet recording system, and the printing device changes the status of ink using the heat energy. With the configuration, data can be recorded with high density and precision.

The typical basic and preferable configuration and principle are disclosed by, for example U.S. Pat. Nos. 4,723,129 and 4,740,796. The system can be applied to the on-demand type and the continuous type. Especially, in the case of the on-demand type, heat energy is generated in an electro-heat conversion member provided corresponding to a sheet or a liquid path holding a liquid (ink) by applying at least one drive signal corresponding to record information for a sudden temperature rise exceeding film boiling to the electro-heat conversion member so that the film boiling can be generated on the heat effect surface of the recording head, thereby effectively generating foam in the liquid (ink) in one-to-one correspondence with the drive signal. By the development and contraction of the foam, the liquid (ink) is jetted through a jet opening, and at least one drop of liquid is formed. When the drive signal forms a pulse, the foam can immediately develop and contract. Therefore, responsive liquid (ink) jet can be generated preferably.

A drive signal of the pulse form is disclosed by U.S. Pat. Nos. 4,463,359 and 4,345,262. Based on the condition described in U.S. Pat. No. 4,313,124 relating to the temperature rise ratio on the heat effect surface, a more preferable recording operation can be realized.

In addition to the configuration of the recording head by a combination of the above-mentioned jet opening, liquid path, and electro-heat conversion member (linear liquid path or right-angle liquid path), the configuration of U.S. Pat. Nos. 4,558,333 and 4,459,600 disclosing the configuration in which a heat effect surface is arranged in the curved area can be included in the present invention. Additionally, Japanese Patent Laid-Open No. 59-123670 disclosing the configuration in which a common slot is used as a jet unit of the electro-heat conversion member for a plurality of electro-heat conversion members, and Japanese Patent Laid-Open No. 59-138461 disclosing the configuration in which an opening for absorbing the pressure wave of heat energy corresponds to the jet unit can be utilized.

Furthermore, a recording head of a chip type electrically connectable to the body of the apparatus and freely exchangeable so that ink can be supplied from the body of the apparatus, or a recording head of a cartridge type in which an ink tank is incorporated into the recording head can also be available.

Additionally, it is preferable to add recovery means, preparatory auxiliary means, etc. to the recording head in the configuration of the recording apparatus according to the present invention because they keep the effect of the present invention more stable. Practical examples can be capping means, cleaning means, pressure or sucking means, an electro-heat conversion member, another heating device, or preparatory heating means obtained by combining any of them, and means for performing a preparatory jet mode in which a jetting operation is performed in addition to the recording jet.

Furthermore, the recording mode of the recording apparatus can include not only important colors such as black, etc., but also at least different plural colors or full colors using mixed colors.

As described above, according to the embodiments of the present invention, the ink is liquid, but the ink solidified at the room temperature or lower, or the ink softened or liquidized at the room temperature can also be available. In the inkjet system, it is common that the temperature is controlled to keep the viscosity of the ink in a stable jet range by adjusting the temperature within the range from 30° C. to 70° C. Therefore, the ink is to be liquid when a use record signal is supplied.

Furthermore, the ink which is solidified in the normal state and liquidized by heating can be applied to prevent the temperature rise by the heat energy by using the heat as the energy for change from the solid state to the liquid state, or to prevent the evaporation of the ink. In any case, the present invention can be applied to the case in which the ink is liquidized by supplying heat energy depending on the record signal and jetted as liquid ink, and in which the ink liquidized when heat energy is supplied, for example, is solidified when it reaches a record medium. In such cases, the ink can be provided for the electro-heat conversion member in the liquid of solid state in a porous sheet concavity portion or a penetrative hole as described in Japanese Patent Laid-Open Nos. 54-56847 and 60-71260 or U.S. Pat. No. 4,608,577. According to the present invention, the most effective system to each type of the above-mentioned ink is the above-mentioned film boil system.

Additional embodiments of the present invention can be the apparatus incorporated into or independent of the computer as an image output terminal of the information processing equipment, a copier combined with a reader etc., and a facsimile device having the function of transmitting/receiving data.

Furthermore, the present invention can be applied to the system configured by plural pieces of equipment, or can be configured as single equipment. It is obvious that the present invention can be attained by providing a program to a system or an apparatus.

As described above, according to the recording apparatus and the method for controlling the recording apparatus of the present invention, the read and write of data to buffer including a plurality of colors can be controlled in a column unit. Under the control, data can be divided into a plurality of recording blocks, and the recording operation can be managed for each recording block, thereby reducing the necessary recording buffer for the recording operation, and efficiently utilizing the buffer area.

Furthermore, although the recording is suspended because the storage of record data is not in time for the recording operation, the recording position can be controlled according to the scanning position information detected by the position detection means of the recording head, thereby resuming the recording and successfully completing the recording in the scanning direction.

As many apparently widely different embodiments of the present invention can be made without departing from the spirit and scope thereof, it is to be understood that the invention is not limited to the specific embodiments thereof except as defined in the claims.

What is claimed is:

1. A recording apparatus having a buffer for dividing a storage area into a plurality of areas in a scanning direction of a recording head to record data of a plurality of colors by allowing a carriage loaded with the recording head to scan data on a record medium, and storing the divided image data corresponding to each color of the plurality of colors in a divided area unit, and recording head position detection means for detecting a position of the recording head, comprising:

a write control unit for controlling write address information about image data in the area unit for each color of the plurality of colors for storage of the image data divided in an area unit in the buffer;

a read-out control unit for generating address information for reading of the stored image data;

storage management means for storing in first storage means and managing first setting information for control of reading of image data according to the address information corresponding to the generated address information;

record data generation means for reading the stored data from the buffer according to the first setting information stored in said storage management means and the address information, and generating record data; and recording head position control means for detecting a scanning position of the recording head for recording the generated data using the recording head position detection means, and controlling a recording position according to the detected scanning position information.

2. The recording apparatus according to claim 1, further comprising second storage means for storing second setting information for reading of image data in the next storage area to be used for storing divided image data adjoining in the scanning direction, wherein said storage management means updates contents of said first storage means into contents of the second setting information upon completion of recording according to the first setting information.

3. The recording apparatus according to claim 1, wherein said storage management means updates flag information for reading of data from the buffer when the second setting information is stored for said first storage means.

4. The recording apparatus according to claim 1, wherein:

said recording head position control means updates position information regarding the recording head and continues recording for a next storage area when the flag information is updated before the position information detected by said recording head position detection means reaches a record starting position of the recording head; and the position information regarding the recording head is held and the recording is suspended when the flag information is not updated before the recording head reaches the record starting position.

5. The recording apparatus according to claim 1, wherein said recording head position control means determines a record starting position according to position information regarding the held recording head when the flag information is updated, and resumes recording.

6. The recording apparatus according to claim 5, wherein the position information regarding the recording head relates to the position of data stored in the buffer.

7. The recording apparatus according to claim 1, wherein the divided image data in an area unit includes color data of cyan, yellow, magenta, and black.

8. The recording apparatus according to claim 1, wherein the buffer stores the image data cyclically among areas set according to leading address information and trailing address information.

9. The recording apparatus according to claim 1, wherein said write control unit prohibits setting an address matching an address of the image data stored in the buffer when the write address information matches the read address information.

10. The recording apparatus according to claim 1, wherein the recording head is an inkjet recording head for jetting ink for recording.

11. The recording apparatus according to claim 1, wherein the recording head jets ink using heat energy, and comprises a heat energy conversion member for generation of heat energy to be applied to ink.

12. A recording apparatus having a buffer for dividing a storage area into a plurality of areas in a scanning direction of a recording head to record data of a plurality of colors by allowing a carriage loaded with the recording head to scan across a record medium, and storing the divided image data corresponding to each color of the plurality of colors in a divided area unit, and recording head position detection means for detecting a position of the recording head, comprising:

a write control unit for controlling write address information regarding image data in the area unit for each color of the plurality of colors for storage of the image data divided in an area unit in the buffer; and recording head control means for suspending recording by the recording head when image data is not written by said write control unit before the recording head reaches a recording position of the image data; and recording suspension position data holding means for holding a position of the suspension detected by said recording head position detection means.

13. A method for controlling a recording apparatus having a buffer for dividing a storage area into a plurality of areas in a scanning direction of a recording head to record data of a plurality of colors by allowing a carriage loaded with the recording head to scan across a recording medium, and storing the divided image data corresponding to each color of the plurality of colors in a divided area unit, and recording head position detection means for detecting a position of the recording head, comprising:

a write controlling step of controlling write address information regarding image data in the area unit for each color of the plurality of colors for storage of the image data divided in an area unit in the buffer;

a read-out controlling step of generating address information for reading of the stored image data;

a storage managing step of storing in a first register and managing first setting information for control of reading of image data according to the address information corresponding to the generated address information;

a record data generating step of reading the stored data from the buffer according to the first setting information and the address information, and generating record data; and a recording head position controlling step of detecting a scanning position of the recording head for recording the generated data using the recording head position detection means, and controlling a recording position according to the detected scanning position information.

14. A record control program used to direct a computer to control a recording apparatus, comprising:

a write controlling module of controlling write address information regarding image data in the area unit for each color of a plurality of colors for storage of the image data divided in an area unit in the buffer;

a read-out controlling module of generating address information for reading of the stored image data;

a storage managing module of storing in a first register and managing first setting information for control of reading of image data according to the address information corresponding to the generated address information;

a record data generating module of reading the stored data from the buffer according to the stored first setting information and the address information, and generating record data; and a recording head position controlling module of detecting a scanning position of the recording head for recording the generated data using the recording head position detection means, and controlling a recording position according to the scanning position information detected by a recording head position detection means.

15. A recording apparatus having recording head position detection means for detecting a position of a recording head for recording an image by scanning a record medium, storage means for dividing a storage area into a plurality of blocks corresponding to a plurality of regions dividing the record medium in a scanning direction of the recording head and storing image data in the blocks, said recording apparatus comprising:

a read-out control unit for reading out sequentially the image data stored in each block of the storage means;

data holding means for holding information related to an amount of the image data stored in each block in order to be read out by said read-out control unit;

record data generation means for generating record data to be output to the recording head based on the information and the image data;

signal generation means for generating flag information for indicating that storing of the image data is not completed before starting recording based on the record data, and generating a signal for indicating the storing of the image data stored in each block is completed;

judgment means for judging whether or not the storing of the image data in a next block is completed before starting of the recording based on the image data stored in the next block, by referring to the flag information in a case where the signal is generated by said signal generation means;

record position generation means for generating record position information of the recording head based on a detection result detected by the recording head position detection means; and record control means for holding the record position information generated by said record position generation means, and suspending the recording corresponding to the next block, in a case where the storing of the image data to be stored in the next block is not completed, wherein said record control means controls recording of the image data corresponding to the next block based on the record position information held by said record control means.

16. The recording apparatus according to claim 15, wherein said data holding means comprises first data holding means for holding information related to an amount of the image data stored in the block to be read out by said read-out control unit, and second data holding means for holding information related to an amount of the image data stored in the next block to be read out by said read-out control unit.

17. The recording apparatus according to claim 16, further comprising:

setting means for setting information related to the amount of the image data to said second data holding means, wherein the flag information comprises a flag to indicate a delay of setting to said second data holding means.

18. The recording apparatus according to claim 15, wherein the amount of the image data includes at least one of a number of rasters and existence of the image data stored in each block.

19. The recording apparatus according to claim 15, wherein said record position generation means comprises a counter for counting a column signal generated based on a signal outputted from the recording head position detection means, and latch means for latching a counted value counted by said counter, and said record control means starts the recording of the image data corresponding to the next block based on the counted value latched by said latch means.

20. The recording apparatus according to claim 15, wherein said data holding means stores each of color data included in the image data stored in each block, and said data holding means holds an amount of each of the color data.

21. The recording apparatus according to claim 15, wherein said record control means controls recording of the image data which has not been recorded by the suspending of recording in a next recording timing.

22. The recording apparatus according to claim 15, wherein said record control means controls the recording from the same region as a suspended region, after suspending of recording.

* * * * *

UNITED STATES PATENT AND TRADEMARK OFFICE
CERTIFICATE OF CORRECTION

PATENT NO. : 6,896,345 B2
APPLICATION NO. : 10/413144
DATED : May 24, 2005
INVENTOR(S) : Nakayama et al.

It is certified that error appears in the above-identified patent and that said Letters Patent is hereby corrected as shown below:

The sheet of drawings consisting of figures 8 and 9 should be deleted to appear as per attached figures 8 and 9.

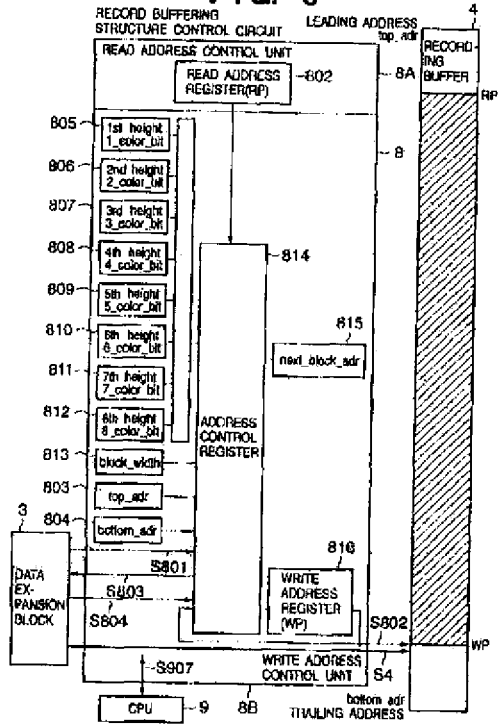

CERTIFICATE OF CORRECTION (continued)
U.S. Pat. No. 6,896,345 B2

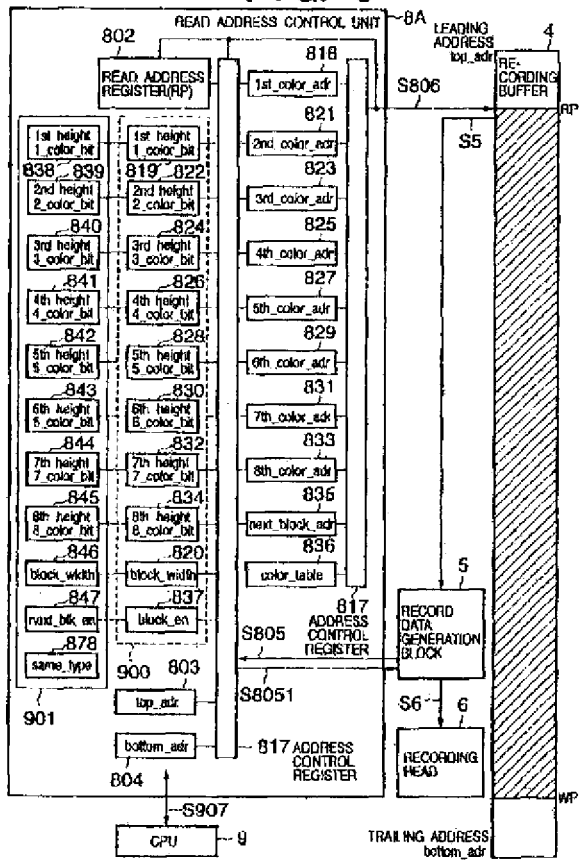

FIG. 9

COLUMN 2
Line 64, "read" should read --reading--.
Line 66, "read" should read --reading--.
Line 67, "according" should read --according to--.

COLUMN 4
Line 54, "a-gate" should read --a gate--.

Signed and Sealed this

Second Day of February, 2010

David J. Kappos
*Director of the United States Patent and Trademark Office*